March 21, 1944.   C. M. HINES   2,344,870
BRAKE CONTROL MEANS
Filed Dec. 24, 1941
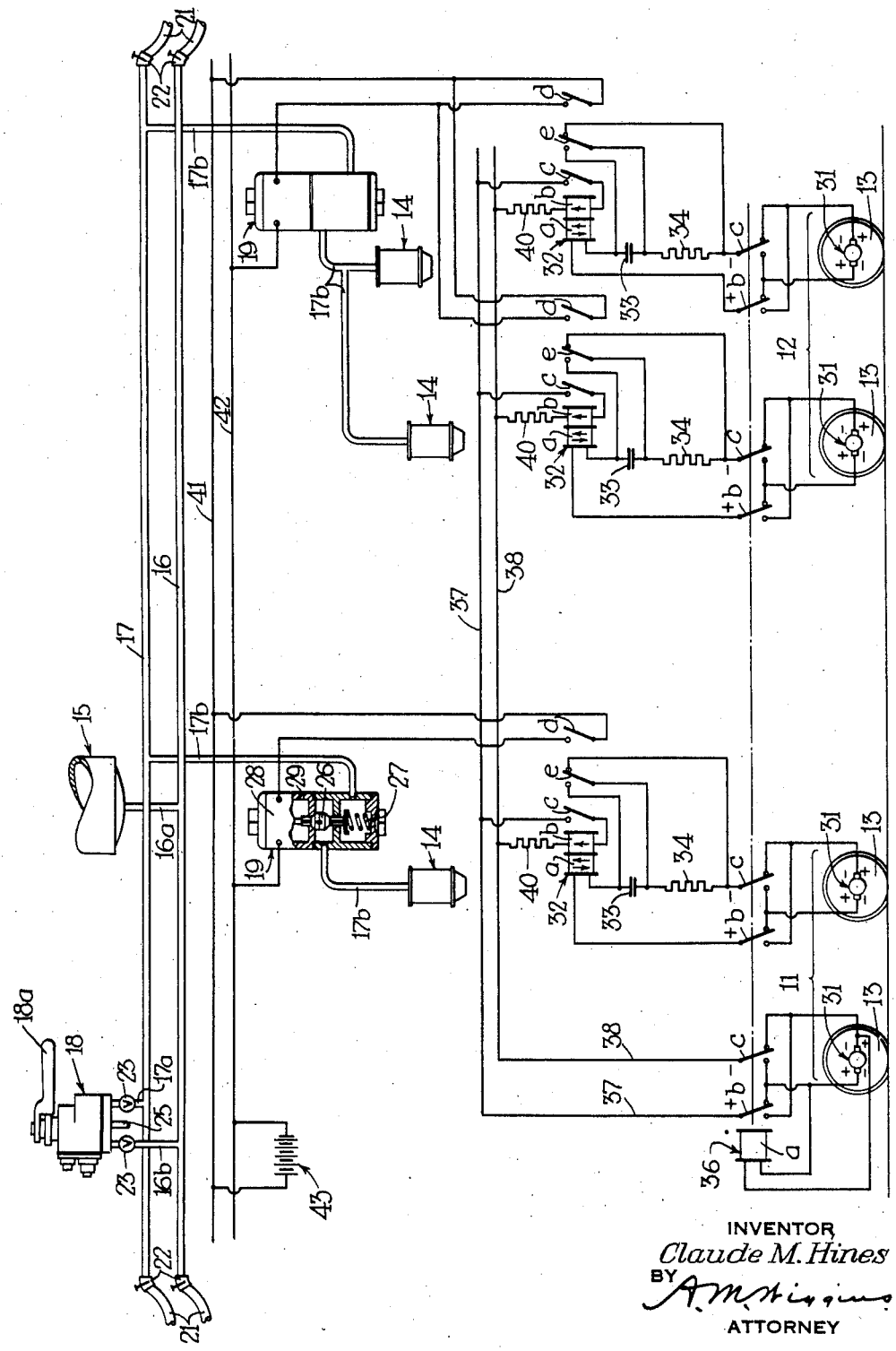
INVENTOR
*Claude M. Hines*
BY
ATTORNEY Patented Mar. 21, 1944

2,344,870

UNITED STATES PATENT OFFICE 2,344,870

BRAKE CONTROL MEANS

Claude M. Hines, Pittsburgh, Pa., assignor to The Westinghouse Air Brake Company, Wilmerding, Pa., a corporation of Pennsylvania Application December 24, 1941, Serial No. 424,299

6 Claims. (Cl. 303—21)

This invention relates to brake control means for vehicles, such as railway cars and trains, and has particular relation to apparatus responsive to the slipping condition of the vehicle wheels for effecting a rapid release of the brakes associated therewith so as to effect restoration of the wheels to a speed corresponding to vehicle speed before the wheels can reach a sliding condition.

The term "slipping condition," as employed herein, designates the rotation of a vehicle wheel at a speed greater or less than a speed corresponding to the speed of the vehicle at a given instant. A slipping condition of a wheel may be induced in response to the application of sufficient braking or propulsion torque on the wheel to exceed the limit of adhesion between the wheel and the rail or road surface. In the case of braking, the wheel of course decelerates rapidly toward a locked condition so that the speed of the wheel is less than that corresponding to the speed of the vehicle. In the case of propulsion, the wheel "races" that is rotates faster than a speed corresponding to vehicle speed.

The term "sliding condition," as employed herein, designates the dragging of a vehicle wheel along a road surface or rail in a locked or nonrotative condition. The two terms are, therefore, not synonymous and the distinction therebetween should be observed.

It has been been demonstrated that if the brakes associated with a vehicle wheel are released promptly and rapidly in response to the occurrence of a slipping condition of the wheel induced by braking, the wheel will be restored to vehicle speed before it can decelerate to a locked or sliding condition.

Various types of brake control equipment have been proposed, including devices for detecting the slipping condition of the wheels, whereby to initiate the release or the reduction in the degress of application of the brakes associated with a slipping wheel when the slipping begins and terminate the reduction in the degree of application of the brakes and initiate a reapplication of the brakes at various times thereafter. For example, in one instance, timing means is provided whereby the release of the brakes initiated in response to the slipping condition of the vehicle wheel is continued until the slipping wheel is restored completely to a speed corresponding to vehicle speed.

It is an object of my present invention to provide brake control apparatus including a device for detecting the slipping condition of a vehicle wheel and effective to initiate a rapid release of the brakes associated with the wheel upon the occurrence of a slipping condition of the wheel, which apparatus is characterized by novel means whereby the reduction in the degree of application of the brakes initiated in response to the operation of the wheel-slip detecting means is terminated and the reapplication of the brakes initiated substantially at the time the slipping wheel is restored to a speed corresponding to vehicle speed.

It is another object of my invention to provide brake control apparatus of the type indicated in the foregoing object in which the means for causing the termination of the reduction in the degree of application of the brakes and initiation of reapplication of the brakes is controlled according to the speed of rotation of the slipping wheel with respect to a speed corresponding to vehicle speed.

The above objects, and other objects of my invention which will be made apparent hereinafter, are attained by apparatus subsequently to be described and shown in the accompanying single figure drawing illustrating a simplified brake control equipment embodying my invention.

Description

Referring to the drawing, the fluid pressure brake control equipment shown is employed on a single car having two wheel trucks located at opposite ends of the car respectively. As will be apparent from subsequent description, however, my invention is readily applicable to an equipment for an entire train of cars.

In the drawing, two four-wheel trucks 11 and 12 are shown. For simplicity only two wheels 13 of each truck are shown, it being understood that each of the wheels shown is fixed on one end of an axle to the opposite end of which a corresponding wheel is fixed. The term "wheel unit" will be hereafter employed to designate a pair of wheels associated with a common axle but the term may also refer to a single wheel.

All of the wheel units except one are provided with suitable brakes, such as the usual clasp-arranged shoe type engaging the rim of the wheel, adapted to be applied and released through intervening brake rigging or levers in response to the supply of fluid under pressure to and the release of fluid under pressure from corresponding brake cylinders 14 shown in substantial vertical alignment above each of the wheel units.

As just indicated, one of the wheel units shown as the left-hand wheel unit of truck 11, is not provided with any brakes. Alternatively, this wheel unit may be provided with brakes having a smaller diameter brake cylinder or suitable brake rigging in order to provide less braking than on the other wheel units. This wheel unit will accordingly hereinafter be referred to as the underbraked wheel unit whereas, the other wheel units will be referred to as the braked wheel units.

The reason for not providing brakes or for providing less braking on the underbraked wheel unit will be made apparent hereinafter, but it may be here briefly stated that it is for the purpose of insuring the continued rotation of such wheel unit at all times in correspondence with speed of travel of the vehicle. It is accordingly optional, as far as the purposes of my present invention are concerned, whether or not the underbraked wheel unit is entirely unbraked or partially braked.

The fluid pressure brake control equipment, shown as of the straight-air type, is effective to control the supply of fluid under pressure to and the release of fluid under pressure from the brake cylinders 14 under the control of the operator of the vehicle. As shown, the equipment may comprise a main reservoir 15 adapted to be maintained normally charged to a certain pressure, such as one hundred pounds per square inch, by a fluid compressor not shown; two train pipes 16 and 17 hereinafter respectively referred to as the supply pipe and the control pipe; a manually operated brake valve 18 of the self-lapping type for controlling the pressure in the control pipe 17; a magnet valve 19 for each wheel truck for controlling communication through which fluid under pressure may be supplied to and released from the brake cylinders 14 of the corresponding wheel truck.

In the case of a train of cars, the train pipes 16 and 17 are made up of sections on respective cars connected through conventional hose couplings 21 and having angle cocks 22 at the ends thereof in the usual manner.

The supply pipe 16 is connected to the main reservoir 15 by a branch pipe 16a and is accordingly constantly charged to the pressure in the reservoir. If desired, a pressure-reducing valve may be located in the branch pipe 16a to cause charging of the supply pipe 16 to a value lower than that in the main reservoir.

The brake valve 18 is of the well known self-lapping type, such as described and claimed in Patent 2,042,112 to Ewing K. Lynn and Rankin J. Bush. Briefly, it comprises a self-lapping valve mechanism including a supply valve, a release valve and a rotary operating shaft, therefore to which an operating handle 18a is secured. Brake valve 18 is connected to the supply pipe 16 and the control pipe 17 by branch pipes 16b and 17a respectively, in which pipes manually operated valve 23 may be interposed effective when closed to cut the brake valve out of operation as may be desired in the case of operation in a train of cars.

With the brake valve handle 18a in its normal brake release position, fluid under pressure is exhausted from the control pipe 17 by way of the branch pipe 17a and an exhaust port and pipe 25 at the brake valve. Upon displacement of the brake valve handle 18a in a horizontal plane out of its brake release position into its application zone, fluid under pressure is supplied from the supply pipe 16 through the pipes 16b and 17a to the control pipe 17, the valve mechanism of the brake valve being automatically self-lapping to establish a pressure in the control pipe corresponding substantially to the degree of displacement of the brake valve handle out of its brake release position. The valve mechanism of the brake valve 18 automatically maintains the pressure corresponding to the position of the brake valve handle by continuing to supply fluid under pressure to the control pipe in the event of a reduction of the pressure in the control pipe for any reason such as leakage. This pressure-maintaining feature of the brake valve will be referred to hereinafter in connection with an assumed operation.

The magnet valves 19 are of conventional type, each having a double beat valve 26 that is normally biased to an upper seated position by a coil spring 27 and actuated to a lower seated position in opposition to the spring 27 upon suitable energization of a magnet winding or solenoid 28.

In its upper seated position, the double beat valve 26 establishes communication through a branch pipe 17b connecting the control pipe 17 to the brake cylinder or cylinders of the corresponding truck. In its lower seated position, the double beat valve 26 closes communication through the pipe 17b from control pipe 17 to the brake cylinders and establishes an exhaust communication through which fluid under pressure is exhausted from the brake cylinders through an exhaust port 29 of the magnet valve.

It will thus be apparent that upon energization of the magnet winding of the magnet valve 19, fluid under pressure is automatically vented from the brake cylinders 14 independently of the maintenance of a control pressure in the control pipe 17.

According to my invention, I provide a direct-current generator 31 for each wheel unit, each generator having its rotary armature arranged to be driven according to the rotational speed of the corresponding wheel unit and effective to produce a voltage substantially proportional to the rotational speed of the wheel unit. Each generator 31 may be mounted in a suitable manner in the journal casing at the end of the axle of a wheel unit in coaxial coupled relation to the end of the axle in the manner indicated. The generators 31 may be provided with a field winding or they may be provided simply with a permanent magnet field core.

Associated with the generator 31 of each of the braked wheel units is a relay 32, hereinafter referred to as the slip relay, an electrical condenser 33, and a resistor 34.

Each of the slip relays 32 comprises two separate windings referred to hereinafter as the pick-up winding $a$ and the holding winding $b$ respectively, two front contacts $c$ and $d$ respectively, and a transfer contact $e$. It will be understood that the front contacts $c$ and $d$ are in dropped-out or open position when the armature of the relay is dropped-out and are actuated to picked-up or closed position in response to the pick-up of the armature of the relay. The transfer contact $e$ functions as a back-contact and a front-contact, that is, in the dropped-out position of the armature of the relay the contact $e$ engages one stationary contact and in the picked-up position of the armature of the relay it disengages the one contact and engages a second stationary contact.

The pick-up winding $a$ of each slip relay 32 and the associated condenser 33 and resistor 34 are connected in series relation in a circuit across the terminals of the corresponding generator 31 under the control of a reversing relay 36.

Reversing relay 36 is of the polarized type having a winding a constantly connected across the terminals of the generator 31 associated with the underbraked wheel unit and having two transfer contacts b and c for each wheel unit. It will be apparent that upon a reversal in the direction of rotation of the vehicle wheels, the polarity at the terminals of the generators 31 is correspondingly reversed. The reversing relay 36 is so constructed and arranged that when the vehicle is traveling in a forward direction, the contacts of the relay are biased to and remain in the dropped-out position shown in the drawing; whereas; when the vehicle is traveling in the opposite direction, the contacts are actuated into their picked-up position.

The contacts b and c are arranged in conventional manner to control the circuit connections to the terminals of the generators 31 so as to maintain a uniform polarity of voltage across the series-related pick-up winding a of relay 32, condenser 33, and resistor 34, notwithstanding a reversal of polarity at the terminals of the generators 31.

In the case of the underbraked wheel unit 31, the corresponding contacts b and c of the reversing relay 36 are effective to maintain a uniform polarity of voltage across a pair of bus wires 37 and 38.

The contact c of each slip relay 32 is effective when actuated to its picked-up position to connect the holding winding b of the corresponding relay in series relation with a current-limiting resistor 40 across the bus wires 37 and 38.

The contact d of slip relay 32 associated with wheel truck 11 is effective when actuated to its picked-up position to connect the magnet winding 28 of the magnet valve 19 across a pair of bus wires 41 and 42, which may be individual to each car, as shown, interconnected from car to car to form train wires. A suitable direct-current voltage is impressed across the bus wires 41 and 42, as by connection to a source of direct-current such as the storage battery 43 on one or more of the cars.

It will thus be seen that as along as the contact d of the relay 32 for wheel truck 11 remains picked-up, the magnet winding 28 of the corresponding magnet valve 19 remains energized.

In a similar manner, the contact d of the two slip relays 32 for the wheel truck 12 are connected in parallel relation and are effective when either is picked-up to establish a circuit connecting the magnet winding 28 of the magnet valve 19 for wheel truck 12 across the bus wires 41 and 42, thereby effecting energization thereof.

The transfer contact e on each of the slip relays 32 is effective in its dropped-out position to establish a short-circuit or shunt connection around the current-limiting resistor 34 associated with the corresponding relays. In its picked-up position, each transfer contact e is effective to open the shunt connection around the resistor 34 and establish a short-circuit or shunt connection around the corresponding condenser 33.

Operation

Let it be assumed that the car having the equipment shown in the drawing is at a standstill with the brake valve handle 18a in its brake release postion so that the brakes are released and that the operator desires to start the car in a forward direction and accordingly operates a suitable power controller, not shown, to supply propulsion power to the vehicle.

Upon acceleration of the car, the voltage at the terminals of the axle-driven generators 31 builds-up, the voltage delivered by the generator 31 of the underbraked wheel unit causing an increase in the voltage across the bus wires 37 and 38 while the increasing voltage delivered by the generators 31 associated with the braked wheel units causes a flow of current to charge the corresponding condensers 33. The flow of current through the pick-up winding a of each slip relay 32 in response to acceleration of the car is assumed to be from the plus to the minus terminals thereof as indicated by the downwardly extending arrow on the pick-up windings. The relays 32 are of such character that a current supplied to charge the condenser 33 and flowing through the pick-up windings a in the direction indicated by the downwardly extending arrow is effective to bias the contacts of the relays to their dropped-out postion. It will accordingly be seen that upon acceleration of the car, the relays 32 remain dropped-out.

Let it now be assumed that having attained a desired speed, the operator desires to bring the car to a stop. To do so, he first shuts off the propulsion power and then operates the brake valve handle 18a into its application zone an amount corresponding to the desired degree of application of the brakes. The control pipe 17 is accordingly charged to a corresponding pressure, for example forty pounds per square inch. At the same time, fluid under pressure is supplied through the pipes 17b to the several brake cylinders 14, thereby effecting application of the brakes on the braked wheels to a degree corresponding to the pressure established in the control pipe 17.

As long as none of the braked wheels slip, no variation in the degree of application of the brakes associated with the braked wheels occurs except in response to variation of the pressure in the control pipe 17 under the control of the operator.

If, however, during an application of the brakes, or at the time an application of the brakes is initiated, the degree of application of the brakes associated with the braked wheels is such as to cause a slipping condition thereof, a further operation occurs which will now be described.

Let it be assumed that the right-hand wheel unit of wheel truck 12 begins to slip during an application of the brakes. In such case, due to the reduction of the voltage supplied by the corresponding axle-driven generator 31, the associated condenser 33 discharges a current reversely in the circuit through the pick-up winding a of the corresponding relay 32 and the armature winding of the generator. The direction of current through the pick-up winding a of the relay 32 is in this case indicated by the upwardly extending arrow on the pick-up winding a.

The current discharged through the pick-up winding a of the slip relay 32 from the condenser 33 is substantially proportional to the rate of reduction of the voltage across the terminals of the corresponding axle-driven generator 31 and accordingly substantially proportional to the rate of rotative deceleration of the corresponding wheel unit. The winding a of the relay 32 is so designed that whenever the current energizing it in the direction of the upwardly extending arrow exceeds a certain value, occurring only when the wheel unit is in a slipping condition, due to braking the contacts of the relay are picked-up. Accordingly, since it is assumed that the wheel unit is in a slipping condition, the energization of the pick-up winding $a$ of the slip relay 32 in response to the current discharged from the corresponding condenser 33 causes the contacts of the relay 32 to be actuated to their picked-up position.

Upon the pick-up of the contact $c$ of the relay 32, the circuit previously described in which the holding winding $b$ of the relay 32 is connected across the bus wires 37 and 38 is established. The connections established by the contact $c$ of the relay 32 are such that current flows through the holding winding $b$ in the direction indicated by the upwardly extending arrow on the holding winding, that is from the positive bus wire 37 to the negative bus wire 38.

Since the generator 31 associated with the under-braked wheel unit provides a voltage, diminishing only in accordance with the reduction in car speed, the energization of the holding winding $b$ is effective to maintain the contacts of the relay 32 in the picked-up position thereof until the occurrence of conditions presently to be described.

The contact $d$ of the slip relay 32 is effective in its picked-up position to connect the magnet winding 28 of magnet valve 19 for the wheel truck 12 across the bus wires 41 and 42, thus effecting energization thereof. The energization of the magnet winding 28 of the magnet valve 19 is effective to cause rapid release of fluid under pressure from the brake cylinders 14 for the wheel units of the wheel truck 12, thereby effecting a rapid reduction in the degree of application of the brakes associated with such wheel units and continuing such reduction as long as the contact $d$ of the relay 32 is maintained in its picked-up position.

Transfer contact $e$ of the relay 32 is effective when actuated to its picked-up position to sequentially remove the shunt connection around the resistor 34 and establish a shunt connection around the condenser 33. Substantially at the instant that the contacts of the relay 32 are picked-up, therefore, a short circuit is established for discharging the condenser 33 rapidly and at the same time inserting the resistor 34 in circuit with the pick-up winding $a$ of the relay 32. Due to the energization of the holding winding $b$ of the relay 32, by the generator 31 associated with the underbraked wheel unit, however, the relay does not as yet drop out.

Due to the rapid reduction in the degree of application of the brakes associated therewith, the wheels of the slipping wheel unit promptly cease to decelerate and begin to accelerate back toward a speed corresponding to vehicle speed, that is, to a speed corresponding to the speed of rotation of the underbraked wheel unit. In such case, therefore, the pick-up winding $a$ of the relay 32 is again energized by flow of current therethrough in the direction of the downwardly extending arrow except that due to the fact that the condenser 33 is now short-circuited by the transfer contact $e$ in its picked-up position, the current energizing the pick-up winding increases merely in accordance with the speed of the corresponding wheel unit.

It will thus be apparent that while the slipping wheel unit is accelerating back toward a speed corresponding to vehicle speed, the pick-up winding $a$ and the holding winding $b$ are simultaneously energized by currents flowing in opposite directions in a manner to produce opposing magnetic fluxes in the magnet core of the relay. Accordingly, the energization of the holding winding $b$ in accordance with the higher voltage delivered by the generator 31 of the underbraked wheel unit predominates over that of the pick-up winding $a$ and thus causes the contacts of the relay to remain picked-up until such time as the effect of the two windings becomes substantially balanced. This condition does not occur until the slipping wheel unit is practically restored to a speed corresponding to vehicle speed, that is, to a speed corresponding to the rotational speed of the underbraked wheel unit.

It will thus be seen that once the slip relay 32 is picked-up in response to the slipping condition of the wheel unit, it is maintained picked-up until such time as the slipping wheel units is practically fully restored to the speed corresponding to vehicle speed.

When the slipping wheel unit has returned practically to the speed corresponding to vehicle speed, the opposing magnetic fluxes produced by the pick-up and holding windings of the relay 32 substantially neutralize each other and the contacts of the relay are restored to their dropped-out position by suitable biasing means, such as a spring or gravity.

Upon the drop-out of the contact $d$ of the slip relay 32, the circuit for energizing the magnet winding 28 of the magnet valve 19 of the wheel truck 12 is interrupted and the magnet valve 19 is thus restored to its normal condition wherein the brake cylinders 14 are connected through the branch pipe 17b to the control pipe 17.

Fluid under pressure is accordingly resupplied to the brake cylinders 14 to establish a pressure therein corresponding to the pressure established in the control pipe, thereby effecting reapplication of the brakes on the wheel units of wheel truck 12 to a corresponding degree.

As a result of the resupply of fluid under pressure to the brake cylinders 14, the pressure in the control pipe 17 tends to reduce but, due to the pressure-maintaining feature the brake valve 18, the pressure is maintained in the control pipe corresponding to the position of the brake valve handle.

The restoration of the contact $c$ of the relay 32 to its dropped-out position interrupts the circuit for energizing the holding winding $b$ of the relay.

The restoration of the transfer contact $e$ of the relay 32 to its dropped-out position removes the short-circuit connection on the condenser 33 and reestablishes the shunt connection around the resistor 34. The equipment is accordingly reconditioned to respond in accordance with the rate of rotative deceleration of the wheel unit.

In the event that the right-hand wheel unit of wheel truck 12 again begins to slip upon reapplication of the brakes thereto in the manner just described, relay 32 is again picked-up and the above cycle of operation is repeated so that at no time is the slipping wheel unit permitted to decelerate to a locked or sliding condition.

In the event that the left-hand wheel unit of wheel truck 12 slips during a brake application, substantially the same operation previously described occurs, except that the operation is initiated in response to the pick-up of the contact $d$ of the relay 32 associated with the corresponding wheel unit.

In a similar manner, if the right-hand wheel unit of wheel truck 11 begins to slip during a brake application, the corresponding slip relay 32 is picked-up to effect a release of the brakes associated with the wheel unit and is restored to its dropped-out position to effect a reapplication in a manner similar to that described above.

When the car or train comes to a complete stop in response to a brake application, the slip relays 32 are always restored to the dropped-out position thereof because of the deenergization of the pick-up and holding windings a and b in response to the lack of voltage delivered by the axle-driven generators 31. Accordingly, the magnet windings 28 of the magnet valves 19 are always deenergized when the car comes to a stop and consequently the brakes are always reapplied at such time.

When the operator again desires to start the car or train, he may do so merely by restoring the brake valve handle 18a to its brake release position, thereby venting fluid under pressure from the brake cylinders and the control pipe 18 to atmosphere through the exhaust port 25 at the brake valve.

Having now described my invention, what I claim as new and desire to secure by Letters Patent, is:

1. In a vehicle wheel brake control system, the combination of control means effective to control application and release of the brakes associated with a wheel unit of the vehicle, means responsive only to the rotative deceleration of the wheel unit at a rate exceeding a certain rate for causing operation of said control means to initiate a reduction in the degree of application of the brakes associated with said wheel unit, and means responsive to the difference of the rotational speed of said wheel unit with respect to the rotational speed corresponding to the speed of the vehicle for causing said control means to effect a continued reduction in the degree of application of the brakes associated with said wheel unit until such time as the wheel unit rotates substantially at vehicle speed and then effective to cause said control means to terminate further reduction in the degree of application of the brakes and initiate reapplication of the brakes on said wheel unit.

2. In a vehicle wheel brake control system, the combination of control means effective to control application and release of the brakes associated with a wheel unit of the vehicle, a relay effective when picked-up to cause said control means to effect reduction in the degree of application of the brakes and when restored to its dropped-out position to cause the control means to terminate the reduction and effect reapplication of the brakes, means responsive only to the rate of rotative deceleration of said wheel unit at a rate exceeding a certain rate for causing pick-up of said relay, and means effective so long as said wheel unit rotates at a speed more than a certain amount less than a speed corresponding to vehicle speed for maintaining said relay picked-up.

3. In a vehicle wheel brake control system, the combination of control means effective to control application and release of brakes associated with a wheel unit of the vehicle, a first source for supplying a voltage substantially proportional to the rotational speed of said wheel unit, a second source for supplying a voltage substantially proportional at all times to the speed of the vehicle, means responsive only to the reduction of the voltage supplied by said first source at a rate exceeding a certain rate for causing operation of said control means to initiate a reduction in the degree of application of the brakes associated with said wheel unit, and means controlled according to the difference in the voltages supplied by said two sources and effective as long as the voltage of said first source is more than a certain amount less than the voltage in said second source for causing said control means to continue to effect reduction in the degree of application of the brakes and effective when the voltage of said first source is less than said certain amount less than the voltage of said second source for causing said control means to terminate the reduction and initiate a reapplication of the brakes on said wheel unit.

4. In a vehicle wheel brake control system, the combination of a first source for supplying a voltage substantially proportional to the rotational speed of a wheel unit of the vehicle, a second source for supplying a voltage substantially proportional at all times to the speed of travel of the vehicle, a relay having two separate windings, means for energizing one of said windings of said relay in a manner to cause pick-up of the relay only when the voltage supplied by the said first source reduces at a rate exceeding a certain rate, means effective while said relay is picked-up for causing energization of the said one winding of said relay by a current proportional to the voltage supplied by said first source, means effective while said relay is picked-up for causing energization of the other winding of said relay by a current proportional to the voltage supplied by said second source, said one and said other winding of said relay being effective when so energized to act in opposition whereby to maintain said relay picked-up as long as the voltage of said first source is more than a certain amount less than the voltage of said second source and to cause drop-out of the relay whenever the voltage of said first source becomes less than said certain amount less than the voltage of said second source, and control means effective as long as said relay is picked-up to cause a continuing reduction in the degree of application of the brakes associated with said wheel unit and operative upon drop-out of the relay to terminate the reduction and initiate a reapplication of the brakes on said wheel unit.

5. In a vehicle brake control system, the combination of a first source for supplying a voltage substantially proportional to the rotational speed of a braked wheel unit of the vehicle, a second source for supplying voltage substantially proportional to the rotational speed of an underbraked wheel unit of the vehicle, means operative only in response to the reduction of the voltage of said first source at a rate exceeding a certain rate for initiating a continued reduction in the degree of application of the brakes associated with said braked wheel unit, and means controlled according to the relation of the voltages of said first and said second sources and effective to cause a continuation of the reduction in the degree of application of the brakes associated with the braked wheel unit as long as the voltages of said sources differ by more than a certain amount and effective when the voltages of said sources differ by less than said certain amount for causing termination in the reduction in the degree of application of the brakes and a reapplication of the brakes.

6. In a vehicle wheel brake control system, the combination of a first source for supplying a voltage substantially proportional to the rotational speed of a wheel unit of the vehicle, a second source for supplying a voltage substantially proportional at all times to the speed of the vehicle, an electrical relay having two separate windings, a condenser, said condenser and the one winding of said relay being connected in series relation and subject to the voltage of said first source whereby said one winding is energized by a current discharged from said condenser upon a reduction of the voltage of said first source which current is substantially proportional to the rate of reduction of the voltage of said first source, said one winding being effective when energized by current discharged from said condenser exceeding a certain value for causing pick-up of the relay, means effective when said relay is picked-up for discharging said condenser through a short-circuit path whereby to cause said one winding of the relay to be thereafter energized by a current proportional to the voltage of said first source, means effective upon pick-up of said relay for causing energization of the other winding of said relay by a current proportional to the voltage of said second source, said one and said other winding acting in opposition when energized in accordance with the voltages of the respective sources and effective to maintain the relay picked-up as long as the voltage of said second source exceeds the voltage of said first source by more than a predetermined amount, and control means controlled by said relay effective to cause a continuing reduction in the degree of application of the brakes associated with the said wheel unit as long as the relay is picked-up and operated to terminate the reduction and initiate the reapplication of the brakes upon restoration of the relay to its dropped-out position.

CLAUDE M. HINES.